United States Patent [19]

Tsuruta

[11] Patent Number: 4,681,194
[45] Date of Patent: Jul. 21, 1987

[54] DISC BRAKE ASSEMBLY WITH PARKING BRAKE MECHANISM

[75] Inventor: Matsuhisa Tsuruta, Toyota, Japan

[73] Assignee: Aisin Seiki Kabushiki Kaisha, Kariya, Japan

[21] Appl. No.: 845,469

[22] Filed: Mar. 28, 1986

[30] Foreign Application Priority Data

Mar. 28, 1985 [JP] Japan ............................ 60-045539[U]

[51] Int. Cl.⁴ ........................ F16D 55/16; F16D 65/56
[52] U.S. Cl. .................................. 188/71.9; 188/72.6; 188/106 F; 188/196 D
[58] Field of Search .................... 188/72.6, 71.8, 71.9, 188/72.8, 72.9, 106 F, 196 D, 73.32, 72.7, 196 P, 196 BA, 196 B, 203, 199, 196 F, 79.5; 92/31; 192/111 A

[56] References Cited

U.S. PATENT DOCUMENTS

| 3,783,981 | 1/1974 | Burgdorf | 188/196 D X |
| 3,976,168 | 8/1976 | Yamamoto | 188/72.8 X |
| 4,378,863 | 4/1983 | Baum | 188/71.9 X |
| 4,392,557 | 7/1983 | Franke | 188/71.9 |
| 4,487,295 | 12/1984 | Mitchell | 188/72.6 |
| 4,596,315 | 6/1986 | Takeuchi et al. | 188/196 D X |
| 4,598,800 | 7/1986 | Marianu | 188/72.6 X |

FOREIGN PATENT DOCUMENTS 5119556 6/1976 Japan .

Primary Examiner—Douglas C. Butler
Attorney, Agent, or Firm—Oblon, Fisher, Spivak, McClelland & Maier

[57] ABSTRACT

A disc brake assembly includes a caliper member, a piston axially slidably disposed within a cylinder body of the caliper member to be actuated by hydraulic fluid under pressure, and a parking brake mechanism assembled within the cylinder body to actuate the piston in its operation.

9 Claims, 9 Drawing Figures

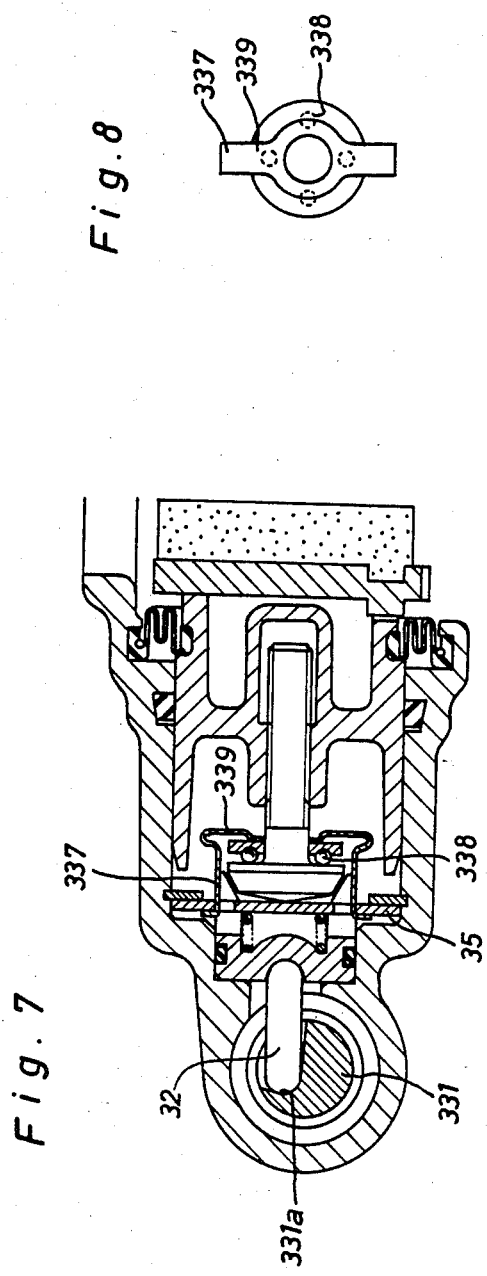

DISC BRAKE ASSEMBLY WITH PARKING BRAKE MECHANISM

BACKGROUND OF THE INVENTION

1. Field of the Invention

The present invention relates to a disc brake assembly for automotive vehicles, and more particularly to a disc brake assembly equipped with a parking brake mechanism, wherein a piston is axially slidably disposed through a sealing ring within a cylinder body of a caliper member to be actuated by hydraulic fluid under pressure supplied into the cylinder body or operation of the parking brake mechanism.

2. Description of the Prior Art

Such a conventional disc brake assembly as described above has been proposed in Japanese Patent Publication No. 51-19556, wherein the parking brake mechanism includes a cup-shaped piston axially slidable within a cylinder body of a caliper member, an adjusting bolt arranged coaxially within the piston and secured to the same, an adjusting nut threadedly coupled over the adjusting bolt and engaged with an internal end wall of the cylinder body through a first thrust bearing, a cup-shaped retainer member disposed within the piston to contain the adjusting bolt and nut and fixed to the internal wall of the piston, a coil spring arranged in surrounding relationship with the adjusting nut and engaged at one end thereof with the retainer member to bias the adjusting nut toward the internal end wall of the cylinder body, a second thrust bearing interposed between the other end of the coil spring and an annular shoulder of the adjusting nut, a plunger axially slidably disposed within a bore formed in a bottom wall of the cylinder body coaxially with the piston and being opposed to the adjusting nut with a predetermined clearance, a cam shaft rotatably mounted within a lateral bore formed in the bottom wall of the cylinder body and being formed with a cam groove facing the rear end of the plunger, and a toggle engaged at one end thereof with the rear end of the plunger and at the other end thereof with the cam groove.

In operation of the parking brake mechanism described above, the piston is moved forward by hydraulic fluid under pressure supplied into the cylinder body to cause forward movement of the adjusting bolt therewith. In this instance, the second thrust bearing cooperates with the coil spring to permit rotation of the adjusting nut in accordance with the forward movement of the adjusting bolt so as to effect automatic adjustment of clearances of the brake shoes with respect to the rotary brake disc in the disc brake assembly. When the piston is pushed into the cylinder body for replacement of the brake shoes, the adjusting bolt is threaded into the adjusting nut to rotate it on the first thrust bearing. Thus, the replacement of the brake shoes is carried out without causing rotation of the piston.

In manufacturing process of the disc brake assembly, however, the adjusting bolt must be secured to the piston, and the toggle, the plunger, the first thrust bearing, the adjusting nut, the second thrust bearing, the coil spring and the retainer member each must be successively assembled within the small cylindrical bores in the cylinder body. This results in decrease of efficiency in assembling work of the components.

SUMMARY OF THE INVENTION

It is, therefore, a primary object of the present invention to provide an improved parking brake mechanism the components of which are arranged to be assembled within the cylinder body of the caliper member in a simple manner without causing any damage of a sealing ring of the piston.

According to the present invention, there is provided a disc brake assembly equipped with a parking brake mechanism, the disc brake assembly including a caliper member having a cylinder body and a reaction portion straddling a portion of a rotary brake disc, and a piston axially slidably disposed in a fluid-tight manner within a cylindrical bore of the cylinder body to be actuated by hydraulic fluid under pressure supplied into the cylinder body.

The parking brake mechanism comprises a cam shaft rotatably mounted within a lateral bore formed in a bottom wall of the cylinder body and being formed with a cam groove, a plunger axially slidably disposed in a fluid-tight manner within an axial bore formed in the bottom wall of the cylinder body coaxially with the cylindrical bore and having an outer end opposed to the cam groove and a cylindrical inner end portion formed with an annular tapered surface and a pair of radial slots, a toggle having one end engaged with the cam groove and another end engaged with the outer end of the plunger, a support plate fixed in place within the cylindrical bore and having an intermediate portion axially slidably engaged with the radial slots of the plunger to restrict rotation of the plunger, a spring interposed between the plunger and the support plate to bias the plunger toward the cam shaft, an adjusting bolt threaded into a nut portion integrally formed with the piston and having a head portion engageable at its center with the support plate and at its outer periphery with the annular tapered surface of the plunger for frictional engagement therewith, a retainer member arranged in surrounding relationship with the head portion of the adjusting bolt and fixed to the support plate, and a thrust bearing coupled with the head portion of the adjusting bolt and resiliently retained by a support portion of the retainer member to permit rotation of the adjusting bolt.

Preferably, the plunger is a stepped plunger axially slidably disposed in a fluid-tight manner within a stepped axial bore formed in the bottom wall of the cylinder body coaxially with the cylindrical bore, the head portion of the adjusting bolt is tapered at its outer periphery for frictional engagement with the annular tapered surface of the plunger and formed at its center with a conical projection engageable with the support plate, and the retainer member is in the form of a cup-shaped retainer member arranged in surrounding relationship with the head portion of the adjusting bolt and fixedly engaged with the support plate, the retainer member being integrally formed with an annular flange for supporting the thrust bearing in place throught a coil spring.

BRIEF DESCRIPTION OF THE DRAWINGS

Other objects, features and advantages of the present invention will become more readily apparent from the following detailed description of a preferred embodiment and certain modifications thereof when taken together with the accompanying drawings, in which:

FIG. 7 is a sectional view of a third modification of the parking brake mechanism shown in FIG. 1;

FIG. 8 illustrates a configuration of a retainer member shown in FIG. 7; and

DETAILED DESCRIPTION OF THE PREFERRED EMBODIMENTS

Figures 1, 2, 9:
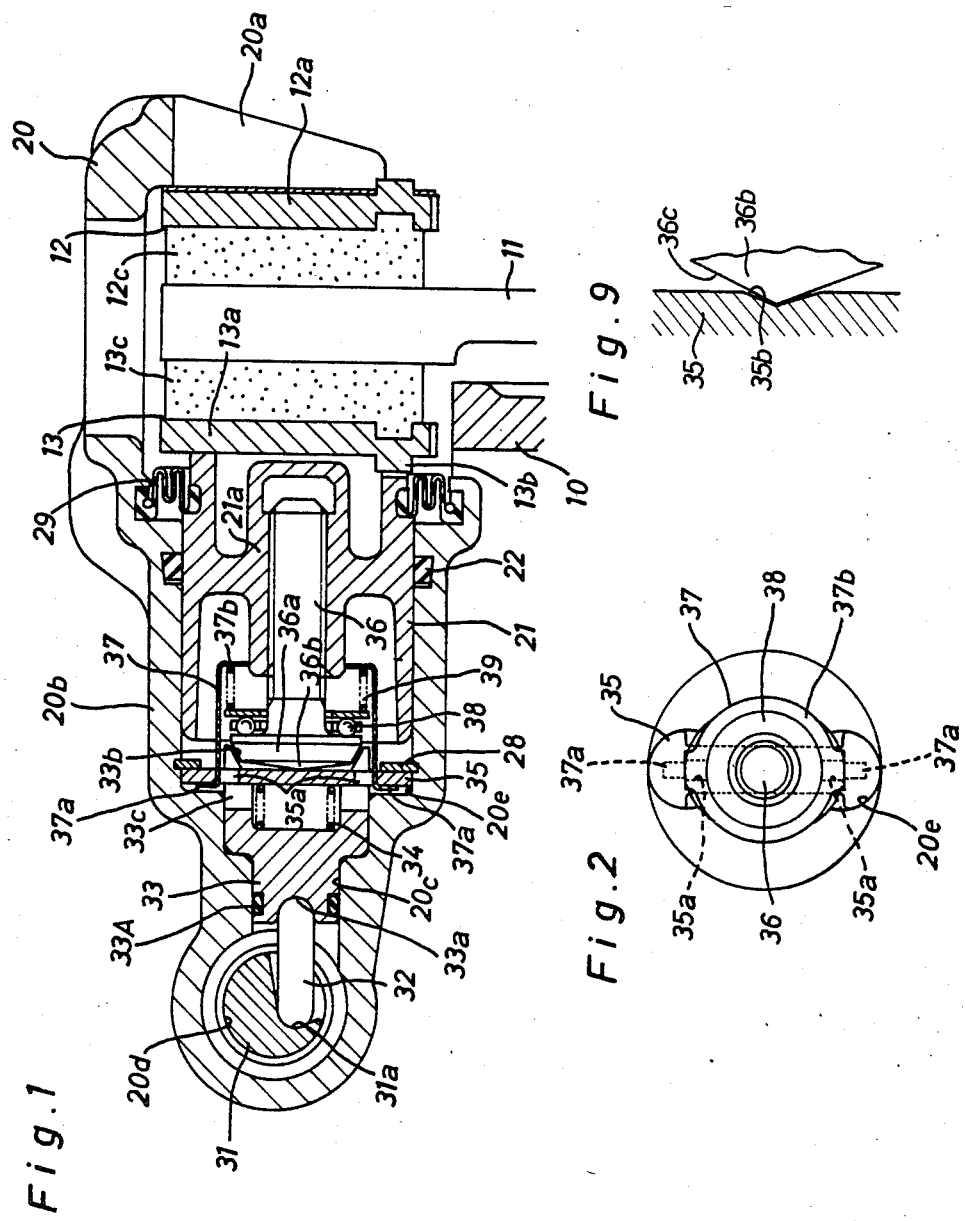
FIG. 1 is a sectional view of a disc brake assembly equipped with a parking brake mechanism in accordance with the present invention.
FIG. 2 illustrates an interrelationship and configuration of a support plate, an adjusting bolt, a thrust bearing and a cup-shaped retainer member shown in FIG. 1.
FIG. 9 illustrates a modification of the support plate shown in FIG. 1.

Referring now to the drawings, particularly in FIGS. 1 and 2, there is illustrated a disc brake assembly equipped with a parking brake mechanism in accordance with the present invention. In the disc brake assembly, a caliper member 20 has a cylinder body 20b and a reaction portion 20a straddling a portion of a rotary brake disc 11 secured for rotation with a vehicle wheel (not shown). The caliper member 20 is axially movably supported in a well-known manner on a torque receiving member 10 fixed to a stationary support structure such as a knuckle arm (not shown). Within a cylindrical bore in the cylinder body 20b, a cup-shaped piston 21 is axially slidably disposed through a sealing ring 22 to press an inner brake shoe 13 directly against one face of the rotary brake disc 11. An outer brake shoe 12 is carried by a pair of bifurcated support arms of the reaction portion 20a to engage the other face of the rotary brake disc 11 due to reaction force caused by actuation of the piston 21.

The outer brake shoe 12 includes a backing plate 12a mounted on the reaction portion 20a of caliper member 20 and having a friction pad 12c secured thereto. The inner brake shoe 13 includes a backing plate 13a mounted on the cylinder body 20b of caliper member 20 and having a friction pad 13c secured thereto. The piston 21 is in abutment with the backing plate 13a of inner brake shoe 13 and is axially movably guided by engagement with a projection 13b of backing plate 13a to restrict rotation of the piston 21 with respect to the cylinder body 20b. An annular dust-boot 29 is secured at its inner periphery to the outer periphery of piston 21 and at its outer periphery to the inner end portion of cylinder body 20b. The piston 21 is arranged to be actuated by hydraulic fluid under pressure supplied into the cylinder body 20b or operation of the parking brake mechanism.

The parking brake mechanism includes a cam shaft 31, a toggle 32, a stepped plunger 33, a first coil spring 34, a support plate 35, an adjusting bolt 36, a cup-shaped retainer member 37, a thrust bearing 38, and a second coil spring 39. The cam shaft 31 is rotatably mounted within a lateral bore 20d in a bottom wall of the cylinder body 20b and is integrally provided at its outer end with a swing lever (not shown) which is arranged adjacent the cylinder body 20b and positioned in place by engagement with a projection of the cylinder body 20b under load of a torsion spring (not shown) acting thereon. The swing lever is operatively connected to a manual parking lever (not shown) which is arranged in a vehicle compartment to be operated by the driver. The torsion spring is interposed between the swing lever and the cylinder body 20b of caliper member 20 to bias the cam shaft 31 clockwise. The toggle 32 has one end disposed within a cam groove 31a in the cam shaft 31 and another end disposed within a recess 33a in an outer end of the stepped plunger 33. The toggle 32 is arranged to cause forward movement of the stepped plunger 33 in accordance with counterclockwise rotation of the cam shaft 31 and to permit backward movement of the stepped plunger 33 in accordance with clockwise rotation of the cam shaft 31.

The stepped plunger 33 is axially slidably disposed through a sealing ring 33A within a stepped axial bore 20c which is formed in the cylinder body 20b coaxially with the cylindrical bore containing therein the piston 21. The stepped plunger 33 has a cylindrical inner end portion which is formed with an annular tapered surface 33b for frictional engagement with a head portion 36a of adjusting bolt 36 and further formed with a pair of radial slots 33c for engagement with the support plate 35. The first coil spring 34 is interposed between the plunger 33 and the support plate 35 to bias the plunger 33 toward the cam shaft 31. As shown in FIG. 2, the support plate 35 is in the form of an I-letter shaped member which is arranged between the plunger 33 and the head portion 36a of adjusting bolt 36. The support plate 35 has a pair of semi-circular ends coupled within a pair of radially spaced semi-circular recesses 20e in the cylinder body 20b and has an intermediate portion axially slidably coupled within the radial slots 33c of stepped plunger 33. The support plate 35 is fixed in place by engagement with an annular retainer 28 under the load of coil spring 34, and the annular retainer 28 is coupled within an annular groove in the cylinder body 20b.

The adjusting bolt 36 is formed thereon with screw threads of large pitch in engagement with the corresponding screw threads formed in a nut portion 21a of piston 21. The head portion 36a of bolt 36 is tapered at its outer periphery for frictional engagement with the annular tapered surface 33b of plunger 33 and is formed at its center with a conical projection 36b engageable with the support plate 35. When the conical projection 36b of bolt 36 is in engagement with the support plate 35 under load of the second coil spring 39, the outer periphery of head portion 36a of bolt 36 is slightly separated from the annular tapered surface 33b of plunger 33. As shown in FIGS. 1 and 2, the cup-shaped retainer member 37 has a pair of radial legs 37a engaged with a pair of radially spaced holes 35a in support plate 35 and an annular flange 37b supporting thereon one end of the second coil spring 39. The thrust bearing 38 and second coil spring 39 are arranged between the head portion 36a of bolt 36 and the annular flange 37b of retainer member 37 in such a manner that the adjusting bolt 36 is loaded by the coil spring 39 through the thrust bearing 38 toward the support plate 35. Thus, the thrust bearing 38 acts to effect smooth rotation of the adjusting bolt 36 under the load of coil spring 39.

In operation of the disc brake assembly, the piston 21 is moved forward toward the rotary brake disc 11 by hydraulic fluid under pressure supplied into the cylinder body 20b to press the inner brake shoe 13 against the one face of rotary brake disc 11, and simultaneously the reaction portion 20a of caliper member 20 is moved toward the rotary brake disc 11 to press the outer brake shoe 12 against the other face of rotary brake disc 11. In this instance, the second coil spring 39 cooperates with the thrust bearing 38 to release the adjusting bolt 36 from the nut portion 21a of piston 21 in accordance with the forward movement of piston 21. When the hydraulic fluid under pressure is exhausted from the cylinder body 20b, the piston 21 is retracted by return action of the sealing ring 22 in a predetermined distance, while the caliper member 20 is retracted by frictional vibration of the outer brake shoe 12 caused by abutment against the rotary brake disc 11. In this instance, the adjusting bolt 36 rotates on the support plate 35 in accordance with the retraction of piston 21 to be threaded into the nut portion 21a of piston 21. Thus, in a released condition of the disc brake assembly, each pad clearance between the rotary brake disc 11 and the respective brake shoes 12, 13 is maintained in a predetermined amount regardless of defacement of the friction pads 12c, 13c.

In operation of the parking brake mechanism, the manual parking lever in the vehicle compartment is operated by the driver to move the swing lever against the torsion spring acting thereon thereby to cause counterclockwise rotation of the cam shaft 31. Thus, the cam groove 31a in shaft 31 is angularly displaced to move the plunger 33 against the first coil spring 34 through the toggle 32, and in turn, the plunger 33 is brought into engagement with the head portion 36a of adjusting bolt 36 at its annular tapered surface 33b to move the adjusting bolt 36 against the second coil spring 39 toward the rotary brake disc 11. As a result, the piston 21 is moved by the plunger 33 through the adjusting bolt 36 toward the rotary brake disc 11 so that the inner brake shoe 13 is pressed into contact with the one face of rotary brake disc 11, while the outer brake shoe 12 is pressed into contact with the other face of rotary brake disc 11 by reaction force acting thereon through the reaction portion 20a of caliper member 20. In this instance, the support plate 35 is retained in place by engagement with the annular retainer 28 under the load of coil spring 34 to restrict rotation of the plunger 33, and the adjusting bolt 36 is maintained in frictional engagement with the annular tapered surface 33b of plunger 33 under the load of coil spring 39 to restrict rotation of the adjusting bolt 36. Thus, the parking brake action is effected without causing any ineffective stroke of the piston 21.

When the manual parking lever is released to cause return movement of the swing lever to its original position, the cam shaft 31 is rotated clockwise by the torsion spring so that the toggle 32, plunger 33, adjusting bolt 36 and piston 21 are retracted to their original positions by biasing forces of the coil springs 34 and 39, while the caliper member 20 is returned to release the brake shoes 12, 13 from the rotary brake disc 11. In this instance, the adjusting bolt 36 is maintained in frictional engagement with the annular tapered surface 33b of plunger 33 until it is engaged with the support plate 35. After engagement with the support plate 35, the adjusting bolt 36 is slightly separated from the annular tapered surface 33b of plunger 33 so that the thrust bearing 38 cooperates with the second coil spring 39 to permit rotation of the adjusting bolt 36. Thus, the piston 21 is retracted to its original position without causing any change of the pad clearances.

When it is desired to replace the brake shoes 12 and 13, the piston 21 is pushed into the cylinder body 20b against the baising forces of coil springs 34 and 39 to remove the brake shoe 13. After replacement of the brake shoe 13 with a fresh one, the piston 21 is returned to its original position under the load of coil springs 34 and 39. In this instance, the thrust bearing 38 cooperates with the coil spring 39 to permit rotation of the adjusting bolt 36 in accordance with axial movements of the piston 21. Thus, the replacement of the brake shoe 13 is carried out without causing rotation of the piston 21. It is, therefore, able to avoid damage of the sealing ring 22 caused by rotation of the piston 21.

In the disc brake assembly, it is able to previously assemble the support plate 35, adjusting bolt 36, thrust bearing 38 and coil spring 39 within the cup-shaped retainer member 37 at the outside of the cylinder body 20b of caliper member 20. When the parking brake mechanism is assembled within the cylinder body 20b of caliper member 20, the cam shaft 31, toggle 32, plunger 33 and coil spring 34 are assembled within the cylinder body 20b in sequence, and thereafter, the cup-shaped retainer 37 is assembled within the cylinder body 20b in such a manner that the support plate 35, adjusting bolt 36, thrust bearing 38 and coil spring 39 are positioned in place. Finally, the piston 21 is inserted into the cylinder body 20b in such a manner that the adjusting bolt 36 is threaded into the nut portion 21a of piston 21. This is useful to facilitate the assembling process of the parking brake mechanism so as to enhance the productivity of the disc brake assembly. In the actual practice of the present invention, it is desirable that as shown in FIG. 9, the support plate 35 is formed at its center with a conical recess 35b engageable with the conical projection 36b of adjusting bolt 36. In such an arrangement, the adjusting bolt 36 is centered by engagement with the conical recess 35b at its conical projection 36b in a simple manner to be coupled with the nut portion 21a of piston 21 during the assembling process of the parking brake mechanism described above.

Figure 4:
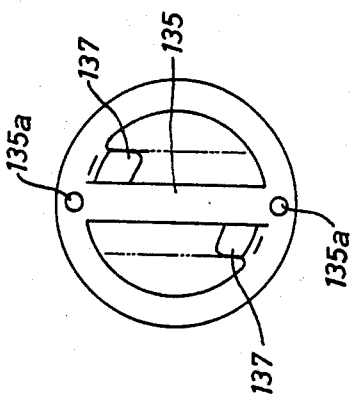
FIG. 4 illustrates a configuration of a retainer member shown in FIG. 3.
Figure 3:
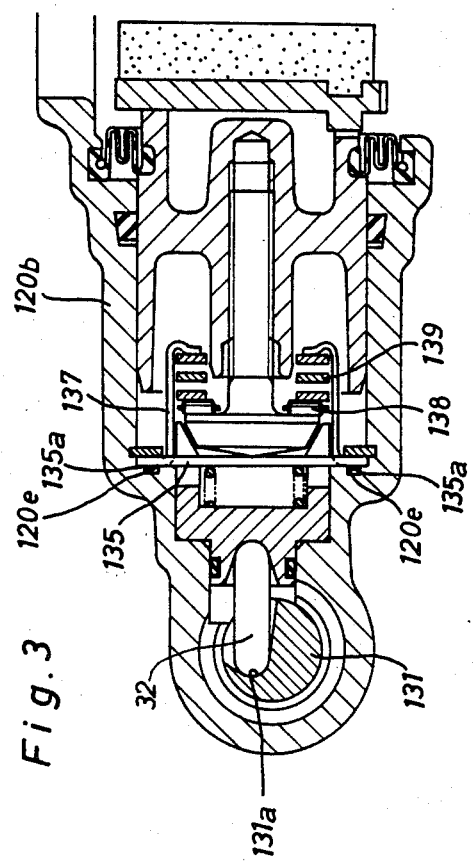
FIG. 3 is a sectional view of a first modification of the parking brake mechanism shown in FIG. 1.

In FIGS. 3 and 4, there is illustrated a first modification of the parking brake mechanism, wherein the support plate 35 and cup-shaped retainer member 37 are replaced with a support plate 135 which is integrally formed with a pair of diametrically opposed axial projections 135a and a pair of diametrically opposed retainer legs 137. The diametrically opposed axial projections 135a of support plate 135 are coupled within a pair of diametrically opposed recesses 120e in the bottom wall of cylinder body 20 to restrict rotation of the support plate 135. In this modification, the thrust bearing 38 and coil spring 39 are further replaced with a needle bearing 138 and a spiral leaf spring 139, and the cam shaft 31 is replaced with a cam shaft 131 which is formed with a cam groove 131a in engagement with the toggle 32 and arranged to be rotated clockwise in operation of the manual parking lever. The other components are substantially the same as those in the parking brake mechanism shown in FIGS. 1 and 2.

Figure 6:
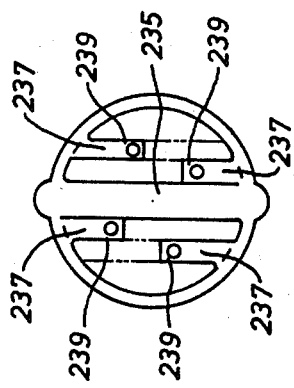
FIG. 6 illustrates a configuration of a retainer member shown in FIG. 5.
Figure 5:
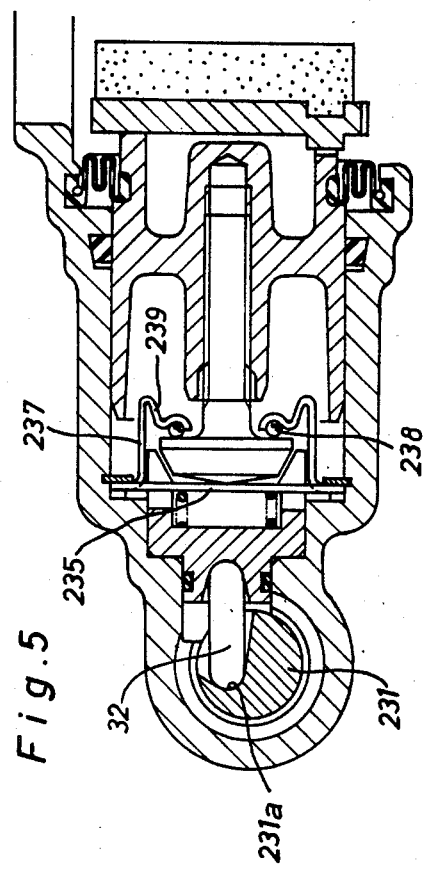
FIG. 5 is a sectional view of a second modification of the parking brake mechanism shown in FIG. 1.

In FIGS. 5 and 6, there is illustrated a second modification of the parking brake mechanism, wherein the support plate 35 and cup-shaped retainer member 37 are replaced with a support plate 235 which is integrally formed with two pairs of diametrically opposed retainer legs 237. In this modification, the thrust bearing 38 is further replaced with circumferentially spaced balls 238 which are retained in place by engagement with respective resilient portions 239 of the retainer legs 237; and the cam shaft 31 is replaced with a cam shaft 231 which is formed with a cam groove 231a in engagement with the toggle 32 and arranged to be rotated clockwise in operation of the manual parking lever. The other components are substantially the same as those in the parking brake mechanism shown in FIGS. 1 and 2.

In FIGS. 7 and 8, there is illustrated a third modification of the parking brake mechanism, wherein the cup-shaped retainer member 37 is replaced with a retainer member 337 which is integrally formed with a resilient support portion 339. In this modification, the thrust bearing 38 is replaced with circumferentially spaced balls 338 which are retained in place by engagement with the resilient support portion 339 of retainer member 337, and the cam shaft 31 is replaced with a cam shaft 331 which is formed with a cam groove 331a in engagement the toggle 32 and arranged to be rotated clockwise in operation of the manual parking lever. The other components are substantially the same as those in the parking brake mechanism shown in FIGS. 1 and 2.

Having now fully set forth both structure and operation of the preferred embodiment and modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A disc brake assembly equipped with a parking brake mechanism, said disc brake assembly including a caliper member having a cylinder body and a reaction portion straddling a portion of a rotary brake disc, and a piston axially slidably disposed in a fluid-tight manner within a cylindrical bore of said cylinder body to be actuated by hydraulic fluid under pressure supplied into said cylinder body, said parking brake mechanism comprising:
    a cam shaft rotatably mounted within a lateral bore formed in a bottom wall of said cylinder body and being formed with a cam groove;
    a plunger axially slidably disposed in a fluid-tight manner within an axial bore formed in the bottom wall of said cylinder body coaxially with said cylindrical bore and having an outer end opposed to said cam groove and a cylindrical inner end portion formed with an annular tapered surface and a pair of radial slots;
    a toggle having one end engaged with said cam groove and another end engaged with the outer end of said plunger;
    a support plate fixed in place within said cylindrical bore and having an intermediate portion axially slidably engaged with the radial slots of said plunger to restrict rotation of said plunger;
    a spring interposed between said plunger and said support plate to bias said plunger toward said cam shaft;
    an adjusting bolt threaded into a nut portion integral with said piston and having a head portion engageable at its center with said support plate and at its outer periphery with the annular tapered surface of said plunger for frictional engagement therewith;
    a retainer member arranged in surrounding relationship with the head portion of said adjusting bolt and fixed to said support plate; and
    a thrust bearing coupled with the head portion of said adjusting bolt and resiliently retained by a support portion of said retainer member to permit rotation of said adjusting bolt.

2. A disc brake assembly as claimed in claim 1, wherein said plunger is a stepped plunger axially slidably disposed in a fluid-tight manner within a stepped axial bore formed in the bottom wall of said cylinder body coaxially with said cylindrical bore.

3. A disc brake assembly as claimed in claim 1, wherein the head portion of said adjusting bolt is tapered at its outer periphery for frictional engagement with the annular tapered surface of said plunger and formed at its center with a conical projection engageable with said support plate.

4. A disc brake assembly as claimed in claim 3, wherein said support plate is formed at its center with a conical recess engageable with the conical projection of said adjusting bolt.

5. A disc brake assembly as claimed in claim 1, wherein said retainer member is a cup-shaped retainer member arranged in surrounding relationship with the head portion of said adjusting bolt and fixedly engaged with said support plate, said retainer member being integrally formed with an annular flange for supporting said thrust bearing in place through a coil spring.

6. A disc brake assembly as claimed in claim 1, wherein said support plate is integrally formed with a pair of diametrically opposed retainer legs which are arranged in surrounding relationship with the head portion of said adjusting bolt to support said thrust bearing in place through a spiral leaf spring.

7. A disc brake assembly as claimed in claim 6, wherein said thrust bearing is a needle bearing.

8. A disc brake assembly as claimed in claim 1, wherein said support plate is integrally formed with a plurality of diametrically opposed retainer legs which are arranged in surrounding relationship with the head portion of said adjusting bolt to resiliently support said thrust bearing in place by engagement therewith.

9. A disc brake assembly as claimed in claim 1, wherein said retainer member is integrally formed with a resilient support portion for resiliently supporting said thrust bearing in place by engagement therewith.

* * * * *